United States Patent
Wu et al.

(10) Patent No.: US 9,237,044 B1
(45) Date of Patent: Jan. 12, 2016

(54) METHODS FOR JOINT OPTIMIZATION OF LINK EQUALIZATION

(71) Applicant: ALTERA CORPORATION, San Jose, CA (US)

(72) Inventors: Hsinho Wu, Santa Clara, CA (US); Masashi Shimanouchi, San Jose, CA (US); Peng Li, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 139 days.

(21) Appl. No.: 13/896,518

(22) Filed: May 17, 2013

(51) Int. Cl.
- *H03H 7/30* (2006.01)
- *H03K 5/159* (2006.01)
- *H04L 25/03* (2006.01)

(52) U.S. Cl.
CPC .............................. *H04L 25/03885* (2013.01)

(58) Field of Classification Search
USPC ................ 375/219, 220, 221, 222, 229–236, 375/240.26–240.29, 285, 295, 316, 340, 375/343, 346, 349, 350, 358, 259, 267, 284, 375/278, 296, 297, 324, 347, 354; 708/300–301, 304, 322–323
See application file for complete search history.

(56) References Cited

U.S. PATENT DOCUMENTS

| | | | |
|---|---|---|---|
| 4,811,360 A | 3/1989 | Potter | |
| 5,461,640 A | 10/1995 | Gatherer | |
| 5,521,767 A | 5/1996 | Weng et al. | |
| 6,369,741 B1 | 4/2002 | Demicheli et al. | |
| 6,438,185 B1 | 8/2002 | Huttunen | |
| 6,954,495 B2 | 10/2005 | Piirainen | |
| 7,248,648 B2 | 7/2007 | Erving et al. | |
| 7,266,146 B2 | 9/2007 | Pare, Jr. et al. | |
| 7,593,493 B2* | 9/2009 | Kent ..................... | H04B 1/7097 375/349 |
| 7,948,699 B2 | 5/2011 | Liu et al. | |
| 8,180,005 B2 | 5/2012 | Kim et al. | |
| 8,290,098 B2* | 10/2012 | Onggosanusi et al. ........ | 375/346 |
| 8,570,933 B2* | 10/2013 | Lioliou et al. ................ | 370/315 |
| 8,660,224 B2* | 2/2014 | Kent et al. ...................... | 375/346 |
| 8,831,082 B2* | 9/2014 | Kumar .......................... | 375/232 |
| 8,897,274 B2* | 11/2014 | Jacob ............................ | 370/336 |
| 2003/0128656 A1* | 7/2003 | Scarpa ......................... | 370/203 |
| 2003/0223489 A1* | 12/2003 | Smee et al. ................... | 375/233 |
| 2005/0128966 A1* | 6/2005 | Yee ............................... | 370/310 |
| 2006/0222097 A1* | 10/2006 | Gupta et al. ................. | 375/260 |
| 2007/0253476 A1* | 11/2007 | Tirkkonen ................ | H04L 1/06 375/230 |
| 2008/0144708 A1* | 6/2008 | Tsuie et al. ................... | 375/227 |
| 2009/0122854 A1* | 5/2009 | Zhu et al. ..................... | 375/232 |
| 2009/0274196 A1* | 11/2009 | Black et al. ................... | 375/147 |
| 2010/0061439 A1* | 3/2010 | Tomlinson et al. ........... | 375/232 |
| 2011/0026576 A1* | 2/2011 | Molev-Shteiman | H04L 25/03038 375/231 |
| 2011/0080877 A1* | 4/2011 | Nentwig ............... | H04L 1/0003 370/329 |
| 2011/0280298 A1* | 11/2011 | Kent et al. ..................... | 375/229 |
| 2011/0292976 A1* | 12/2011 | Sen et al. ...................... | 375/219 |

(Continued)

*Primary Examiner* — Linda Wong
(74) *Attorney, Agent, or Firm* — Okamoto & Benedicto LLP

(57) ABSTRACT

One embodiment relates to a computer-implemented method that selects one of at least three procedures to determine equalization settings jointly for a transmitter and a receiver. A first process may be used if the end-of-channel signal-to-noise ratio (SNR) is greater than an SNR threshold and the equalization capability of the transmitter is greater than the equalization capability of the receiver. A second process may be used if the end-of-channel SNR is greater than the SNR threshold and the equalization capability of the transmitter is less than the equalization capability of the receiver. A third process may be used if the end-of-channel SNR is less than the SNR threshold. Other embodiments and features are also disclosed.

19 Claims, 7 Drawing Sheets

(56) References Cited

U.S. PATENT DOCUMENTS

| | | | |
|---|---|---|---|
| 2012/0076194 A1* | 3/2012 | Banna | H04B 1/7097 375/232 |
| 2012/0106405 A1* | 5/2012 | Lioliou et al. | 370/279 |
| 2012/0120990 A1* | 5/2012 | Koren et al. | 375/219 |
| 2012/0127886 A1* | 5/2012 | Kim et al. | 370/252 |
| 2012/0314750 A1* | 12/2012 | Mehrabani | 375/229 |
| 2013/0003817 A1* | 1/2013 | Ling et al. | 375/232 |
| 2013/0072124 A1* | 3/2013 | Nsenga | 455/63.4 |
| 2013/0251019 A1* | 9/2013 | Kolze | 375/232 |
| 2014/0044107 A1* | 2/2014 | Jacob | 370/336 |
| 2014/0072022 A1* | 3/2014 | Medles et al. | 375/227 |
| 2014/0219327 A1* | 8/2014 | Kumar | 375/232 |

\* cited by examiner

METHODS FOR JOINT OPTIMIZATION OF LINK EQUALIZATION

TECHNICAL FIELD

The present invention relates generally to the transfer of data across communication links.

DESCRIPTION OF THE BACKGROUND ART

High-speed serial links are used to communicate data between devices in a system. Serial interface protocols have been developed at increasingly fast data rates for such high-speed links. Examples of industry-standard protocols for serial interfaces include PCI Express® (Peripheral Component Interconnect Express), XAUI (X Attachment Unit Interface), sRIO (serial Rapid IO), and others.

As the operating speed of the high-speed serial links increases to rates which are tens of gigabits per second (Gbps) or more, it has become increasingly challenging to perform equalization sufficient to achieve desired bit error rate (BER) targets. In order to achieve the desired BER targets, both transmitter equalization and receiver equalization may be used.

SUMMARY

One embodiment relates to a computer-implemented method that selects one of multiple procedures to determine equalization settings jointly for a transmitter and a receiver. A first process may be used if the end-of-channel signal-to-noise ratio (SNR) is greater than an SNR threshold and the equalization capability of the transmitter is greater than the equalization capability of the receiver. A second process may be used if the end-of-channel SNR is greater than the SNR threshold and the equalization capability of the transmitter is less than the equalization capability of the receiver. A third process may be used if the end-of-channel SNR is less than the SNR threshold.

Another embodiment relates to a process of determining equalization settings jointly in which a set of candidate settings, rather than a single setting, for transmitter equalization is selected. A determination is then made, for all candidate settings in the set of candidate settings, whether a corresponding receiver equalization setting is to be found by auto adaptation for a candidate setting. If the corresponding receiver equalization setting is to be found without auto adaptation, then, for all receiver equalization settings, a receiver equalization setting is selected, link simulation is performed with the candidate setting and the selected receiver equalization setting, and a figure of merit (FOM) for a resulting waveform from the link simulation is computed and recorded. The FOM may be composed of the eye diagram height, width, or combination of other metrics.

Another embodiment relates to a process of determining equalization settings jointly in which an optimal setting for receiver continuous-time linear equalization (CTLE) is determined from a set of candidate CTLE settings. A tap to be adapted is selected from multiple taps of a transmitter finite impulse response (FIR) filter, and link simulation is performed using a channel model, the optimal setting for receiver CTLE, and a test setting for the multiple taps of the transmitter FIR filter. A determination is made as to whether a figure of merit (FOM) from the link simulation is increasing. If the FOM is decreasing, then a FOM descending count is computed, and a determination is made as to whether the FOM descending count is less than a threshold count.

Note that the above-mentioned link simulation may include effects from both transmitter and receiver building blocks. These building blocks may include phase-locked loops (PLLs), driver and receiver circuitry, equalization schemes at both the transmitter and the receiver, and clock and data recovery (CDR). In addition, the link simulation may include channel components or conditions, such as insertion loss, reflection, noise contributions, and crosstalk.

Another embodiment relates to a process of determining equalization settings jointly in which a minimal setting for receiver CTLE is computed depending upon a computed compensation range for receiver DFE. An optimal transmission skew and phase adjustment is then found given the minimal setting for the receiver CTLE. The optimal setting for the receiver DFE is then computed given the minimal setting for the receiver CTLE and the optimal transmission skew and phase adjustment.

Other embodiments relate to an article of manufacture which embodies computer-readable code to implement the above-described method or processes. Other embodiments, aspects and features are also disclosed herein.

DETAILED DESCRIPTION

Finding optimal transmitter and receiver equalization settings in a joint manner is highly challenging due to complex channel characteristics and a very large search space for the transmitter and receiver equalization settings. For example, a transmitter may have tens of thousands of equalization settings, and a receiver may have tens of millions of equalization settings. Hence, in this example, the combined search space may have several hundreds of billions of possible equalization settings.

Searching such a large parameter space is prohibitive in terms of computational time and resources. As such, conventional approaches typically optimize the transmitter and receiver equalization settings separately without taking into account each other, rather than interactively and jointly. This often results in sub-optimal settings.

The present disclosure provides three optimization processes that cover a wide variety of applicable link and device configurations. In addition, a selection method to select one of the optimization processes is provided.

The techniques disclosed herein are advantageously accurate and efficient. The jointly-optimized equalization settings provide better equalization results (for example, larger eye diagram openings) than separately-optimized equalization settings. In addition, the jointly-optimized equalization settings are found without the computational resources and time required to perform a full parameter sweep or a multiple iterative procedure. Applicants believe that the techniques disclosed herein are also improvements over prior heuristic search and optimization techniques.

Figure 1:
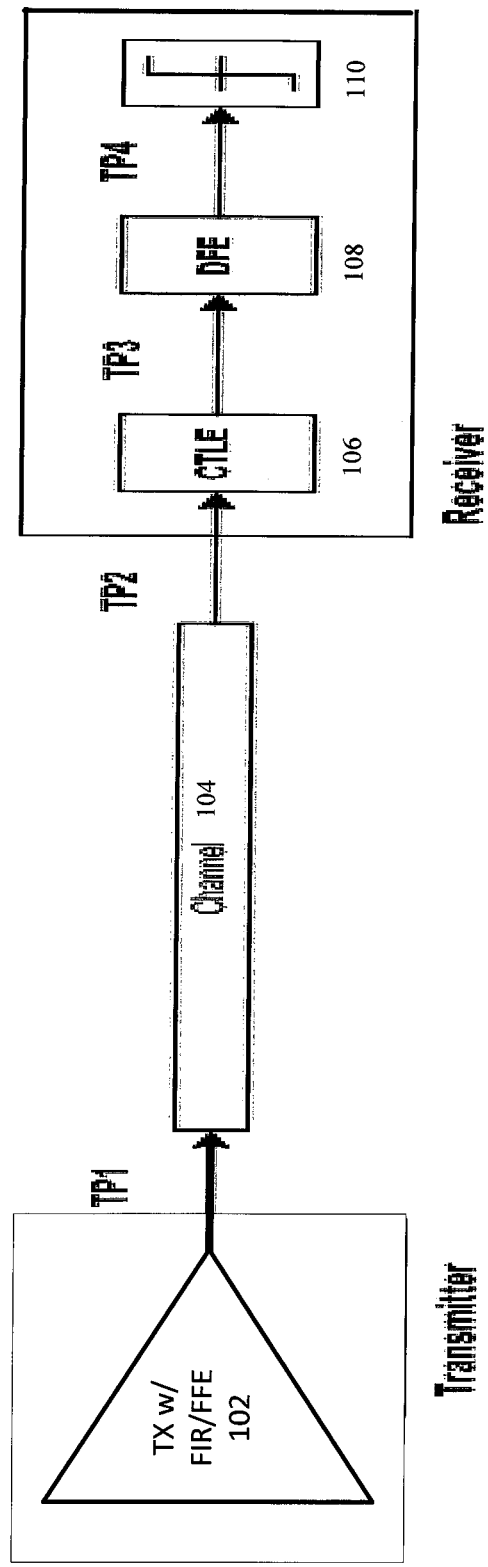
FIG. 1 depicts select components of an exemplary one-way point-to-point link in accordance with an embodiment of the invention.

FIG. 1 depicts select components of an exemplary one-way point-to-point link in accordance with an embodiment of the invention. As shown, the link includes a communication channel connecting a transmitter device and a receiver device. The transmitter may include feed forward equalization (FFE) using a finite impulse response (FIR) filter and may include a PLL which generates and conditions the reference clock source. The receiver may include continuous-time linear equalization (CTLE), feed forward equalization (FFE), clock and data recovery (CDR) which recovers the frequency and phase, as well as the timing conditioning, of the incoming data stream. The receiver may also include decision feedback equalization (DFE).

Four test points are depicted in FIG. 1. A first test point (TP1) is shown as being the point where the signal leaves the transmitter (TX) driver 102 before it enters the communication channel 104. A second test point (TP2) is shown as being the point where the signal leaves the communication channel 104 before it enters the CTLE circuit 106. A third test point (TP3) is shown as being the point where the signal leaves the CTLE circuit 106 before it enters the DFE circuit 108. Finally, a fourth test point (TP4) is shown as being the point where the equalized signal 110 leaves the DFE circuit 108.

Figure 2:
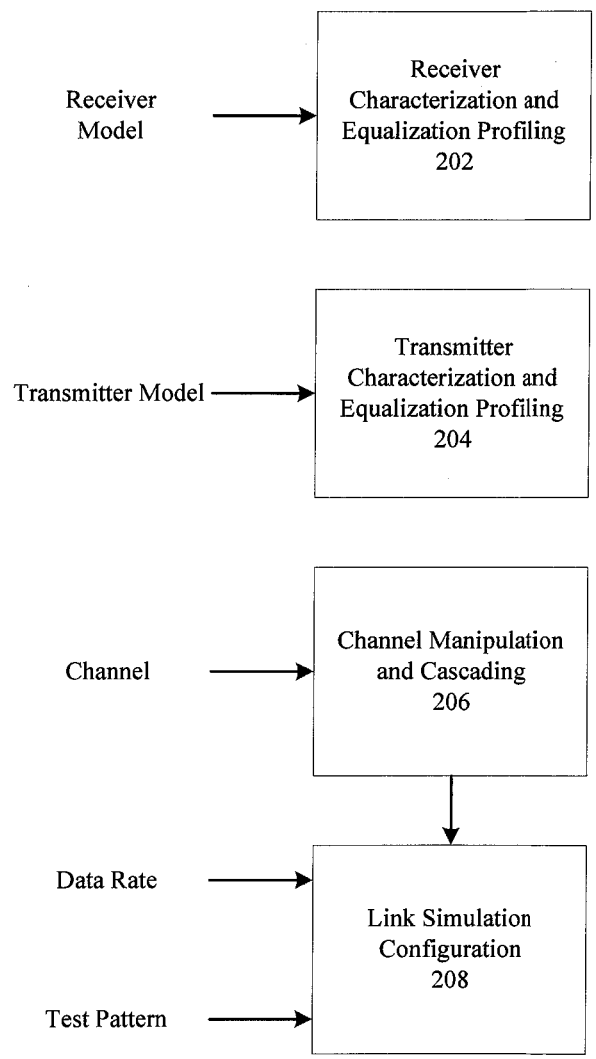
FIG. 2 depicts profiling and configuration processes that may be used in a joint equalization process in accordance with an embodiment of the invention.

FIG. 2 depicts profiling and configuration processes that may be used in joint equalization process in accordance with an embodiment of the invention. As shown, receiver characterization and equalization profiling 202 may be performed using a receiver model. Similarly, a transmitter model may be used for transmitter characterization and equalization profiling 204 may be performed using a transmitter model. In addition, depending on the particular channel, channel manipulation and cascading 206 may be performed. Link simulation configuration 208 may be performed using the output of the channel manipulation and cascading and depending on the particular data rate and test pattern. The link simulation in block 208 may test the signal at TP2 (between the channel and the CTLE) or equivalently at TP3 (between the CTLE and DFE) with the CTLE turned off. These profiling and configuration processes may be performed using conventional procedures.

Figure 3:
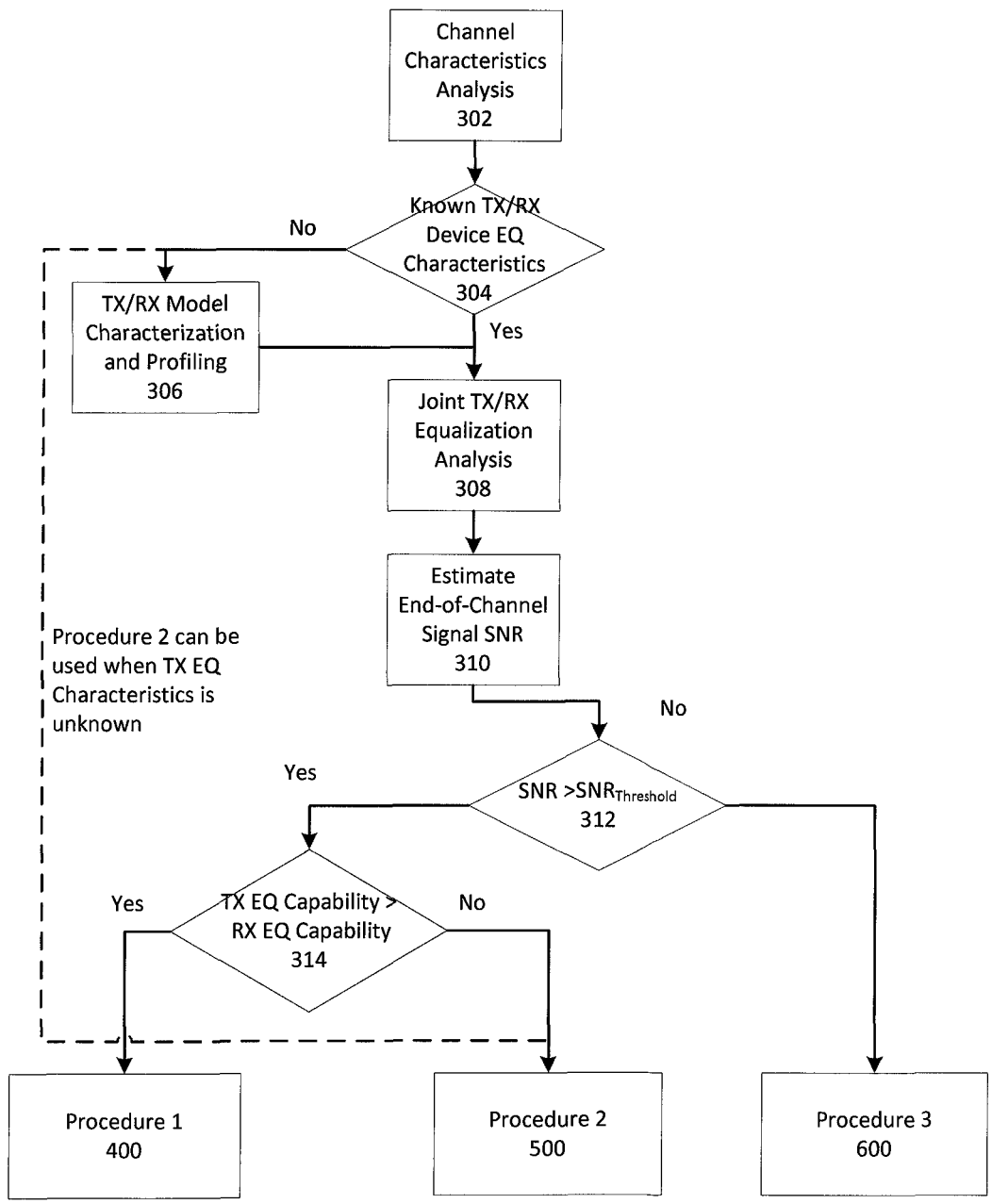
FIG. 3 is a flow chart of a method for selecting between three joint equalization processes in accordance with an embodiment of the invention.

FIG. 3 is a flow chart of a method 300 for selecting between three joint equalization processes in accordance with an embodiment of the invention. Per block 302, channel characteristics analysis may be performed using a conventional technique.

Per block 304, a determination may be made as to whether the transmitter and receiver (TX/RX) device equalization (EQ) characteristics are already known. If either or both of those characteristics are not yet known, then transmitter and/or receiver model characterization and profiling may be performed, per block 306, so as to provide the missing device EQ characteristics.

Note that, if it is determined that the TX EQ characteristics are unknown while the RX EQ characteristics are known, the method 300 may take an alternate path shown by the dashed line and select the second joint equalization process (Procedure 2) 500. This second process or process 500 is described below in relation to FIG. 5.

Per block 308, once the TX/RX device EQ characteristics are known, then joint transmitter and receiver (TX/RX) equalization analysis may be performed per block 308, and a signal-to-noise ratio (SNR) for an end-of-channel signal may be estimated by computation per block 310. The SNR for the end-of-channel signal may be computed at TP2 (at the end of the channel and before the CTLE in the receiver).

A comparison of the SNR for the end-of-channel signal against a threshold SNR ($SNR_{Threshold}$) may then be made per block 312. If the SNR for the end-of-channel signal is determined to be greater than the threshold SNR in block 312, then a further determination may be made per block 314 as to whether the TX EQ capability or the RX EQ capability is greater. The TX EQ capability is greater if the equalization circuitry in the transmitter has a greater capability to equalize the signal than the equalization circuitry in the receiver. The RX EQ capability is greater if the equalization circuitry in the receiver has a greater capability to equalize the signal than the equalization circuitry in the transmitter.

If the TX EQ capability is determined to be greater per block 314, then the first joint equalization process or procedure (Procedure 1) 400 may be performed. This first process 400 is described below in relation to FIG. 4.

If the RX EQ capability is determined to be greater per block 314, then the second joint equalization process or procedure (Procedure 2) 500 may be performed. This second process 500 is described below in relation to FIG. 5.

Referring back to block 312, if the SNR for the end-of-channel signal is determined to be less than (or equal to) the threshold SNR in block 312, then the third joint equalization process or procedure (Procedure 3) 600 may be performed. This third process 600 is described below in relation to FIG. 6.

Figure 4:
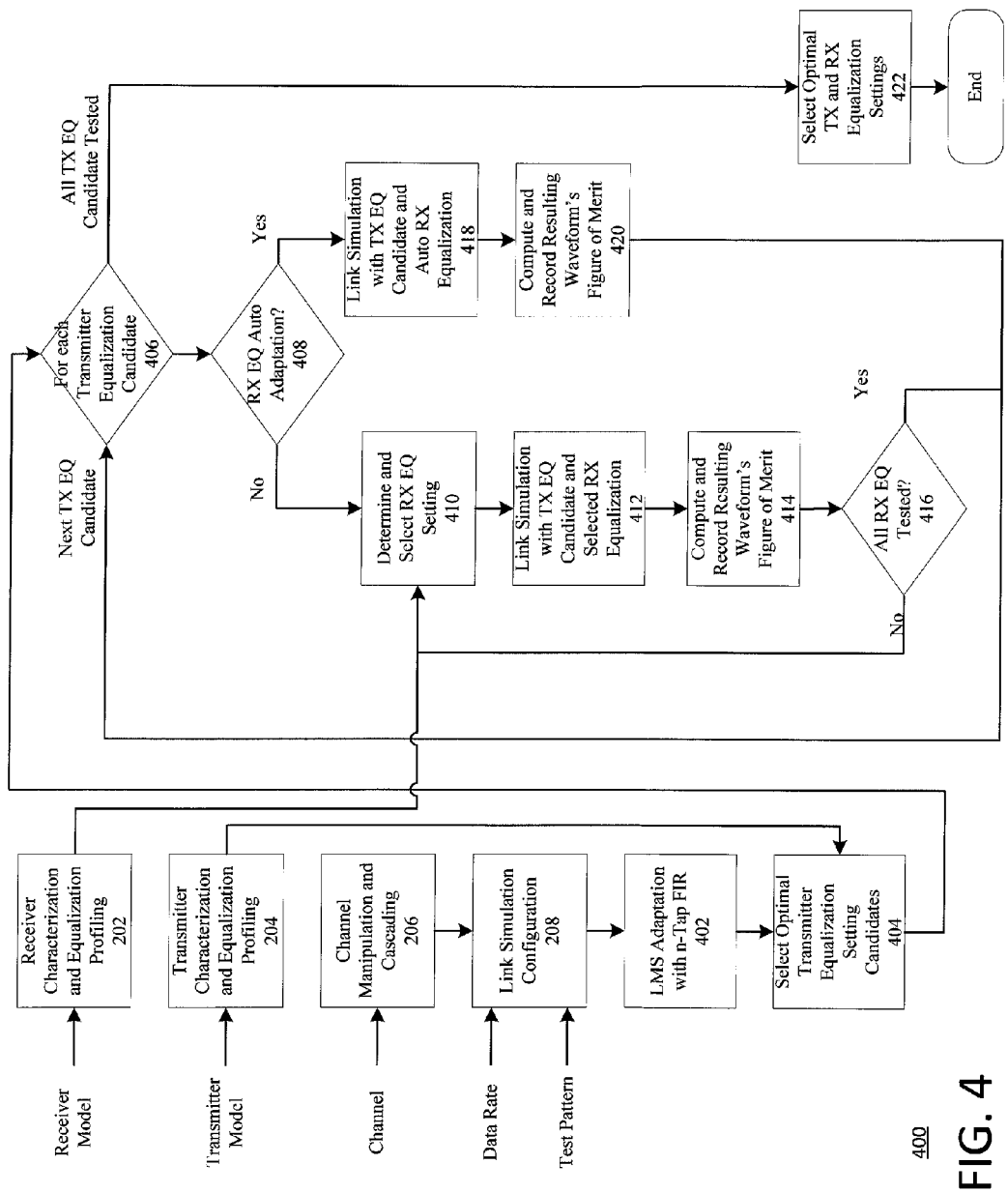
FIG. 4 is a flow chart of a first joint equalization process in accordance with an embodiment of the invention.

FIG. 4 is a flow chart of a first joint equalization process 400 in accordance with an embodiment of the invention. This process 400 may be applied when it is determined that the transmitter equalization capability is greater than the receiver equalization capability. As such, a prioritization may be made of the transmitter channel characteristics-based FIR setting, and the receiver equalization setting may be selected using a search procedure. The search procedure may be, for example, a sequential search.

As shown, the results of the link simulation and configuration from block 208 may be utilized to perform least-mean-square (LMS) adaptation with an n-tap FFE at the transmitter per block 402. Per block 404, a set of optimal transmitter equalization setting candidates may be selected using the transmitter characterization profiling from block 204 and the results of the LMS adaptation from block 402.

For each transmitter equalization setting candidate per block 406, a determination may be made, per block 408, as to whether the corresponding receiver equalization setting is to be determined without or with auto adaptation. The corresponding setting for receiver equalization is determined for each candidate setting for transmitter equalization.

If the determination and selection is to be made without auto adaptation, then the results of the receiver characterization and equalization profiling from block 202 may be used to determine and select a receiver equalization setting per block 410. Thereafter, link simulation is performed per block 412, and the resulting FOM, which may be calculated from the waveform-like eye diagram's opening height and width or derived metrics from the waveform-like SNR, may be computed and recorded per block 414. The above-mentioned link simulation may be performed with the transmitter equalization candidate setting, and the selected receiver equalization setting. In addition, the link simulation may take into account the settings and effects of other device blocks, such as PLL blocks and CDR blocks, for example. The link simulation may also take into account link conditions, such as noise and jitter conditions.

The link simulation in block 412 (and also in block 418 described below) may test the signal at TP3 (between the CTLE and the DFE) or at TP4 (after the DFE) in the receiver. If TP3 is used, then the CTLE setting is being optimized. If TP4 is used, then the CTLE and DFE settings are being jointly optimized for a given transmitter equalization candidate setting.

A determination may then be made per block 416 as to whether all the receiver equalization settings from block 202 have been tested (i.e. simulated for computation of its figure of merit). If there are more receiver equalization settings from block 202 to be tested, then the process 400 loops back to block 410 and selects one of the remaining receiver equalization settings for testing. Once all the receiver equalization settings from block 202 have been tested, then the process 400 loops back to block 406 and the procedure continues for a next transmitter equalization candidate, if any.

On the other hand, if auto adaptation is to be used per block 408, then the receiver equalization setting may be obtained from the auto adaptation. Thereafter, per block 418, link simulation may be performed using the transmitter equalization candidate setting and the auto-adapted receiver equalization setting, and the resulting waveform's FOM may be computed and recorded per block 420. The process 400 may then loop back to block 406 by selecting a next transmitter equalization candidate.

Once all transmitter equalization candidate settings have been tested, then the process 400 may go to block 422. Per block 422, the optimal transmitter and receiver equalization settings may be selected. This selection may be made by finding the highest (i.e. the best) figure of merit and selecting the transmitter candidate equalization setting and corresponding receiver equalization setting that is associated with that figure of merit.

Figure 5:
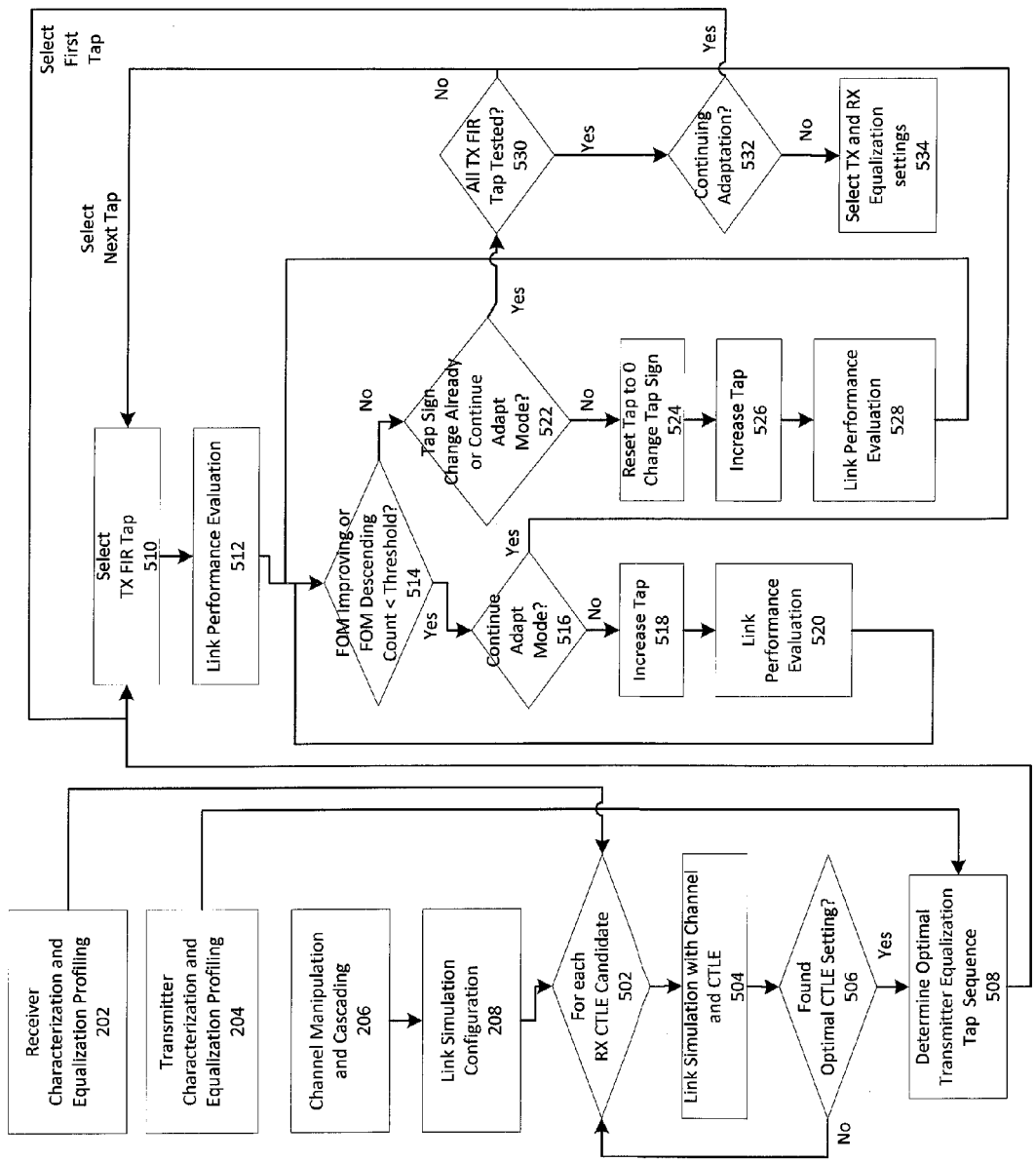
FIG. 5 is a flow chart of a second joint equalization process in accordance with an embodiment of the invention.

FIG. 5 is a flow chart of a second joint equalization process 500 in accordance with an embodiment of the invention. This process 500 may be applied when it is determined that the transmitter equalization capability is less than the receiver equalization capability. As such, a prioritization may be made of the receiver equalization setting (i.e., the CTLE and DFE settings), and the transmitter equalization setting may be selected using a search procedure. The search procedure may be, for example, a conditional gradient transmitter FIR/pre-emphasis search with variable noise tolerance.

Per blocks 502 and 504, for each receiver CTLE candidate setting, the results of the link simulation and configuration from block 208 may be utilized to perform link simulation with the channel and CTLE. This testing of the receiver CTLE candidate settings continues until an optimal CTLE setting is found per block 506. Per block 508, an optimal transmitter equalization tap sequence (to be used as the transmitter equalization tap selection sequence) may be determined using the transmitter characterization and equalization profiling from block 204 and the optimal CTLE setting from block 506.

The transmitter equalization setting may then be determined using the following adaptation procedure. Per block 510, the transmitter FIR taps may be selected sequentially starting from the first tap in the transmitter equalization tap selection sequence. For each selected FIR tap, link performance evaluation may be performed per block 512. The link performance evaluation may utilize link simulation with the channel model and optimal CTLE setting (and the DFE setting if TP4 is used), and, optionally, settings and effects of other device blocks, such as PLL and CDR blocks. The link performance evaluation may also take into account link conditions, such as noise and jitter. Alternatively, the link performance evaluation may use other techniques such as single-pulse/impulse analysis or statistical channel analysis.

The link simulation may test the signal at either TP3 (after the CTLE and before the DFE) or TP4 (after the DFE) in the receiver. If TP3 is used, then the TX FIR is being optimized given the channel model and optimal CTLE setting, without taking into account the effect of the DFE. If TP4 is used, then the TX FIR is being optimized given the channel model and optimal CTLE setting, while taking into account the effect of the DFE.

Based on the link simulation results from block 512, a determination may be made, per block 514, as to whether a figure of merit (FOM) based on the results is increasing (improving) or a FOM descending count is less than a threshold count. The FOM descending count is a count of a number of consecutive link evaluation which have resulted in a decreasing (i.e. degrading or worsening) FOM. Referring to the "Yes" branch from block 514, if the FOM increased (i.e. improved) based on the currently-tested TX FIR tap or the FOM descending count is less than the threshold count, then a determination may be made, per block 516 as to whether the Continue Adapt mode is set (active) or not. The Continue Adapt mode is a mode executed after the initial round of adaptation in which all FIR taps are tested. The Continue Adapt mode may be implemented to further optimize the equalization settings based on TX FIR coefficients found in the previous round. In the Continue Adapt mode, the range of TX FIR adjustments may be limited to a small value so that the impact to the link condition is under control (i.e. is within controlled limits). Advantageously, with this algorithm design, the Continue Adapt mode can be realized in a "live" (i.e. currently operational) link.

In the initial adaptation of a link, the Continue Adapt mode is not set so that a larger range of TX FIR adjustments may be explored and made. In this case, after block 516, the process 500 moves forward to block 518 in which the tap value is increased, and link performance evaluation may be performed per block 520. The link performance evaluation may utilize link simulation with the channel model and optimal CTLE setting (and the DFE setting if TP4 is used), and, optionally, settings and effects of other device blocks, such as PLL and CDR blocks. The link performance evaluation may also take into account link conditions, such as noise and jitter. Alternatively, the link performance evaluation may use other techniques such as single-pulse/impulse analysis or statistical channel analysis. Thereafter, the process 500 loops back to block 514. After the initial round of adaptation, the Continue Adapt mode may be set, if desired. In this case, after block 516, the process 500 selects a next TX FIR tap from the transmitter equalization tap selection sequence (that was determined in block 508) by looping back to block 510.

Referring to the "No" branch from block 514, if the FOM did not increase based on the currently-tested TX FIR tap and the FOM descending count has reached the threshold count, then a further determination may be made, per block 522, as to whether the tap sign has changed already, or whether the adaptation is in the Continue Adapt mode.

If the tap sign has not already changed for the currently-tested TX FIR tap, and the algorithm is not in the Continue Adapt mode, then the process 500 may go from block 522 to block 524. Per block 524, the tap value for this tap is reset to zero and the tap sign is changed (for example, from positive to negative, or vice versa). Thereafter, the tap value for this tap may be increased in magnitude per block 526, and link performance evaluation may be performed per block 528. Thereafter, the process 500 loops back to block 514. The link performance evaluation may utilize link simulation with the channel model and optimal CTLE setting (and the DFE setting if TP4 is used), and, optionally, settings and effects of other device blocks, such as PLL and CDR blocks. The link performance evaluation may also take into account link conditions, such as noise and jitter. Alternatively, the link performance evaluation may use other techniques such as single-pulse/impulse analysis or statistical channel analysis.

If the tap sign has already changed for this tap, or the adaptation is in the Continue Adapt mode, then the process 500 may go from block 522 to block 530. Per block 530, a determination may be made as to whether all the TX FIR taps have been tested. If not all the TX FIR taps have been tested, then the process 500 may loop back to block 510 and select a next tap as specified in the transmitter equalization tap selection sequence (determined in block 508). If all the TX FIR taps have been tested, then the process 500 may move forward to block 532 where a further determination is made as to whether the adaptation is to be continued in the Continue Adapt mode. If so, then the first tap may be selected, and the process 500 may loop back to block 510. If not, then the testing may be deemed complete, and the optimal transmitter and receiver equalization settings may be selected per block 534. In this case, the CTLE setting may be the optimal CTLE setting determined per block 506, the DFE setting may be a default setting, and the TX FIR tap values may be selected based on the FOM results.

Figure 6:
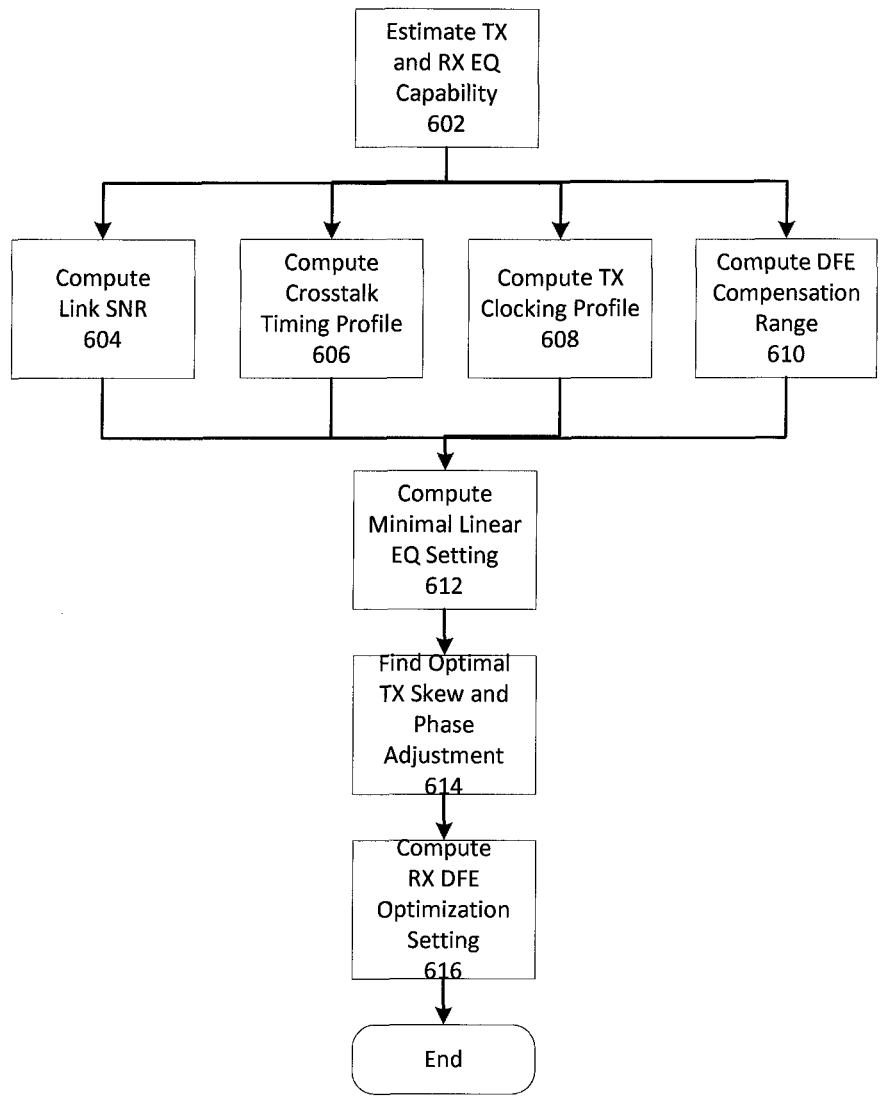
FIG. 6 is a flow chart of a third joint equalization process in accordance with an embodiment of the invention.

FIG. 6 is a flow chart of a third joint equalization process 600 in accordance with an embodiment of the invention. This process 600 may be applied when it is determined that the end-of-channel SNR is less than a threshold SNR. As such, a prioritization may be made of DFE with crosstalk reduction through adjustment of transmitter phase and skew.

Per block 602, the transmitter equalization capability and the receiver equalization capability may be approximated or estimated. Subsequently, various computations may be made. Per block 604, the link signal-to-noise ratio (SNR) may be computed. Per block 606, the crosstalk timing profile may be computed. Per block 608, the transmitter clocking profile may be computed. Per block 610, the DFE compensation range may be computed. Using the results of the computations in blocks 604 through 610, the equalization settings may be determined or computed per blocks 612 through 616.

Per block 612, a minimal linear equalization setting may be determined or computed for both a TX FIR filter and a RX CTLE. The minimal setting for the CTLE may be based on or take into account the DFE compensation range determined in block 610. This minimal setting may be applied to the CTLE to purposefully limit the linear equalization.

Subsequently, with the minimal linear equalization setting, an optimal transmission skew and phase adjustment may be determined per block 614. This determination may use link simulation and testing at TP3 (between the CTLE and the DFE) to determine the optimal transmitter setting with the minimal linear equalization setting.

Lastly, with the optimal transmitter setting and the minimal linear equalization setting, the optimal DFE setting may be determined or computed per block 616. This determination may use link performance evaluation at TP4 (after the DFE) to determine the optimal DFE setting.

Example Computer Apparatus for Implementing the Methods

Figure 7:
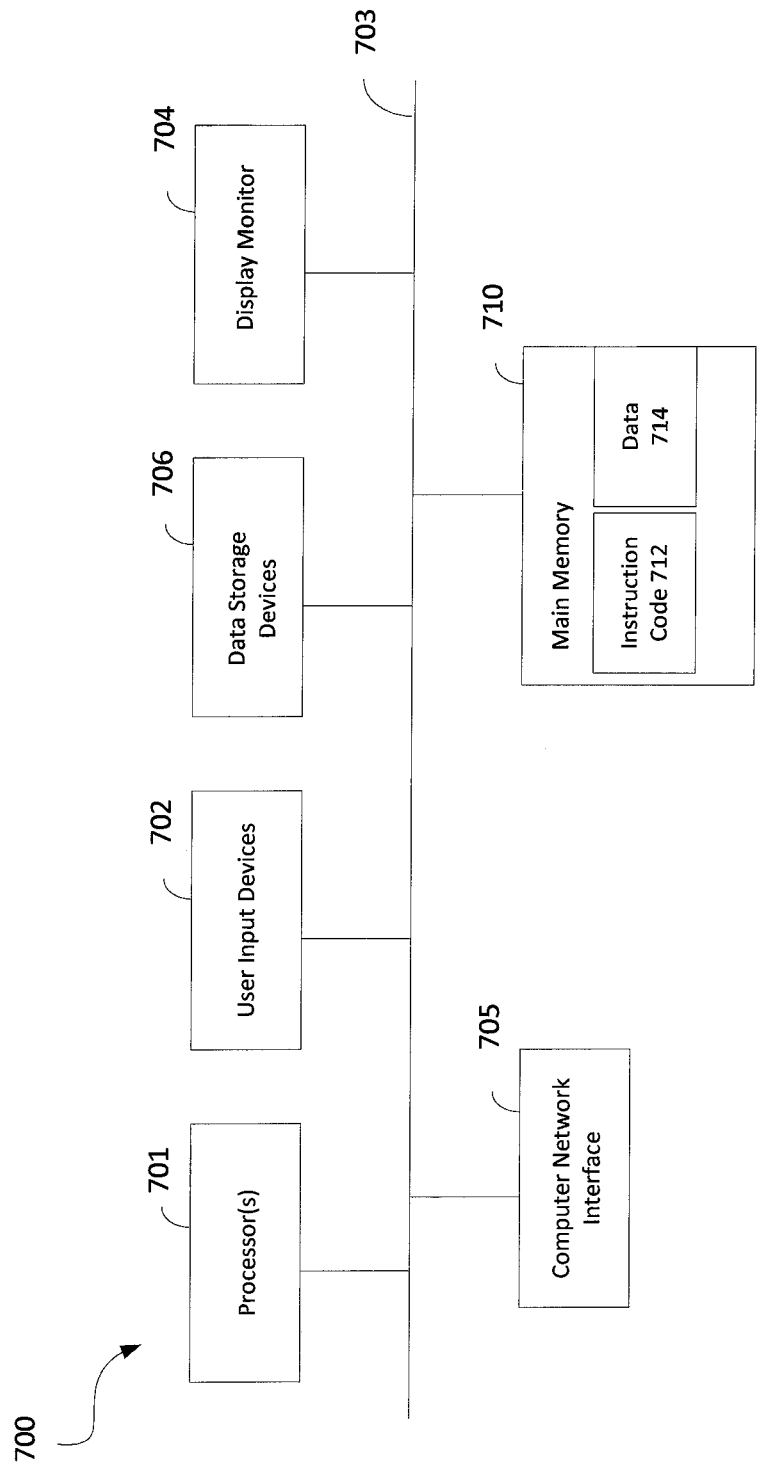
FIG. 7 depicts a simplified form of an example computer apparatus 700 in accordance with an embodiment of the invention.

FIG. 7 depicts a simplified form of an example computer apparatus 700 in accordance with an embodiment of the invention. Such a computer apparatus may be used, for example, to implement and perform the methods described above. This figure shows just one simplified example of such a computer apparatus.

As shown, the computer apparatus 700 may include one or more processors 701, such as those from the Intel Corporation of Santa Clara, Calif., for example. The computer apparatus 700 may have one or more buses 703 communicatively interconnecting its various components. The computer apparatus 700 may include one or more user input devices 702 (e.g., keyboard, mouse, etc.), a display monitor 704 (e.g., liquid crystal display, flat panel monitor, etc.), a computer network interface 705 (e.g., network adapter, modem), and a data storage system that may include one or more data storage devices 706 which may store data on a hard drive, semiconductor-based memory, optical disk, or other tangible non-transitory computer-readable storage media, and a main memory 710 which may be implemented using random access memory, for example.

In the example shown in this figure, the main memory 710 includes instruction code 712 and data 714. The instruction code 712 may comprise executable computer-readable program code (i.e., software) components which may be loaded from the tangible non-transitory computer-readable medium of the data storage device 706 to the main memory 710 for execution by the processor(s) 701. In particular, the instruction code 712 may be programmed to cause the computer apparatus 700 to perform the steps in the methods described herein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method that selects one of multiple processes to determine equalization settings jointly for a transmitter and a receiver, the method comprising:

computing a signal-to-noise ratio (SNR) for a signal at an end of a channel between the transmitter and the receiver;

determining, by computational logic, whether the computed SNR for the signal is above a SNR threshold;

determining, by computational logic, when an equalization capability of the transmitter is greater than an equalization capability of the receiver;

using a first process to determine equalization settings jointly for the transmitter and the receiver when the computed SNR for the signal is greater than the SNR threshold and when the equalization capability of the transmitter is greater than the equalization capability of the receiver;

using a second process to determine the equalization settings jointly for the transmitter and the receiver when the computed SNR for the signal is greater than the SNR threshold and when the equalization capability of the transmitter is less than the equalization capacity of the receiver; and using a third process to determine the equalization settings jointly for the transmitter and the receiver when the computed SNR for the signal is less than the SNR threshold;

equalizing the signal in the transmitter and the receiver with the equalization settings determined jointly for the transmitter and receiver.

2. The method of claim 1, wherein the first process selects a set of candidate settings for the transmitter equalization and searches for a corresponding receiver equalization setting for each candidate setting of the set of candidate settings.

3. The method of claim 1, wherein the second process selects a setting for continuous-time linear equalization at the receiver and subsequently searches for a corresponding transmitter equalization setting.

4. The method of claim 1, wherein the third process determines and applies a minimal setting for linear equalization at the receiver.

5. The method of claim 1, wherein the first process comprises:
selecting a set of candidate settings for transmitter equalization;
determining, for all candidate settings in the set of candidate settings, whether a corresponding receiver equalization setting is to be found by auto adaptation for a candidate setting;
when the corresponding receiver equalization setting is to be found without auto adaptation, then, for all receiver equalization settings, selecting a receiver equalization setting, performing a link simulation with the candidate setting and the selected receiver equalization setting, and computing and recording a figure of merit for a resulting waveform from the performed link simulation, wherein the performed link simulation includes at least transmitter and receiver equalization schemes.

6. The method of claim 5, wherein the first process further comprises:
when the corresponding receiver equalization setting is found with auto adaptation, then performing the link simulation with the candidate setting and an automatically adapted receiver equalization setting, and computing and recording the figure of merit for the resulting waveform from the performed link simulation.

7. The method of claim 5, wherein the first process further comprises:
performing least-mean-square adaptation with a multiple-tap feed forward equalizer at the transmitter; and
selecting the set of candidate settings from results of the least-mean-square adaptation.

8. The method of claim 5, wherein the first process further comprises:
selecting an optimal candidate setting and the corresponding receiver equalization setting based on the figure of merit for the resulting waveform.

9. The method of claim 1, wherein the second process comprises:
determining an optimal setting for receiver continuous-time linear equalization (CTLE) from a set of candidate CTLE settings;
determining a transmitter tap equalization selection sequence based on characteristics of a transmitter FIR filter and a channel;
selecting a tap adapted from multiple taps of the transmitter FIR filter;

performing a link simulation using a channel model, the optimal setting for receiver CTLE, and a test setting for the multiple taps of the transmitter FIR filter; and
determining whether a figure of merit (FOM) from the performed link simulation is increasing or degrading, wherein the performed link simulation includes at least equalization schemes performed at both the transmitter and the receiver.

10. The method of claim 9, wherein the second process further comprises:
when the FOM is degrading, then increasing an FOM descending count and determining whether the FOM descending count is less than a threshold count;
when the FOM is degrading and the FOM descending count has reached the threshold count, then determining whether a tap sign has changed already for the selected tap and whether a continue adapt mode is set.

11. The method of claim 9, wherein the second process further comprises:
when the tap sign has not changed already and the continue adapt mode is not set, then changing the tap sign for the selected tap, increasing a tap value and performing the link simulation.

12. The method of claim 9, wherein the second process further comprises:
when the FOM is increasing, then determining whether a continue adapt mode is set; and
when the continue adapt mode is not set, then increasing a tap value and performing the link simulation; and
when the continue adapt mode is set, then selecting a next transmitter FIR tap from the transmitter equalization tap selection sequence.

13. The method of claim 1, wherein the third process comprises:
computing a minimal setting for transmitter finite impulse response filter (FIR) and receiver continuous-time linear equalization (CTLE) depending upon a computed compensation range for receiver decision feedback equalization (DFE);
finding by use of computational logic an optimal transmission skew and phase adjustment given the minimal setting for the receiver CTLE; and
computing an optimal setting for the receiver DFE given the minimal setting for the transmitter FIR and receiver CTLE and the optimal transmission skew and phase adjustment.

14. A tangible, non-transitory computer readable medium storing computer readable instruction code executed by a processor to cause the processor to select one of multiple processes to determine equalization settings jointly for a transmitter and a receiver, comprising:
computer-readable instruction code for computing a signal-to-noise ratio (SNR) for a signal at an end of a channel between the transmitter and the receiver;
computer-readable instruction code for determining by computational logic whether the computed SNR for the signal is above a SNR threshold;
computer-readable instruction code for further determining by computational logic when an equalization capability of the transmitter is greater than an equalization capability of the receiver;
computer-readable instruction code for a first process to determine equalization settings jointly for the transmitter and the receiver when the computed SNR for the signal is greater than the SNR threshold and the equalization capability of the transmitter is greater than the equalization capability of the receiver;

computer-readable instruction code for a second process to determine the equalization settings jointly for the transmitter and the receiver when the computed SNR for the signal is greater than the SNR threshold and the equalization capability of the transmitter is less than the equalization capability of the receiver; and computer-readable instruction code for a third process to determine the equalization settings jointly for the transmitter and the receiver when the computed SNR for the signal is less than the SNR threshold;

computer-readable instruction code for equalizing the signal in the transmitter and the receiver with the equalization settings determined jointly for the transmitter and receiver.

15. The tangible, non-transitory computer-readable medium of claim 14, wherein the computer-readable code for the first process selects a set of candidate settings for the transmitter equalization and searches for a corresponding receiver equalization setting for each candidate setting.

16. The tangible, non-transitory computer-readable medium of claim 14, wherein the computer-readable code for the first process:
 selects a set of candidate settings for transmitter equalization;
 determines, for all candidate settings in the set of candidate settings, when a corresponding receiver equalization setting is to be found by auto adaptation for a candidate setting; and
 when the corresponding receiver equalization setting is to be found without auto adaptation, then, for all receiver equalization settings, selects a receiver equalization setting, performs link simulation with the candidate setting and the selected receiver equalization setting, and computes and records a figure of merit for a resulting waveform from the performed link simulation.

17. The tangible, non-transitory computer-readable medium of claim 14, wherein the computer-readable code for the second process determines an optimal setting for continuous-time linear equalization at the receiver and further determines a transmitter tap equalization selection sequence based on characteristics of a transmitter FIR filter and a channel.

18. The tangible, non-transitory computer-readable medium of claim 14, wherein the computer-readable code for the third process determines and applies a minimal setting for linear equalization at the receiver.

19. The tangible, non-transitory computer-readable medium of claim 14, wherein the computer-readable code for the third process:
 computes a minimal setting for receiver continuous-time linear equalization (CTLE) depending upon a computed compensation range for receiver decision feedback equalization (DFE);
 finds by use of computational logic an optimal transmission skew and phase adjustment given the minimal setting for the receiver CTLE; and
 computes an optimal setting for the receiver DFE given the minimal setting for the receiver CTLE and the optimal transmission skew and phase adjustment.

* * * * *